Patented Nov. 5, 1935

2,019,720

UNITED STATES PATENT OFFICE 2,019,720

CELLULOSE ACETATE COMPOSITION CONTAINING PARA-PHENYL ACETOPHENONE

Thomas F. Murray, Jr., Rochester, N. Y., assignor to Eastman Kodak Company, Rochester, N. Y., a corporation of New York No Drawing. Application May 26, 1934,
Serial No. 727,754

5 Claims. (Cl. 106—40)

This invention relates to the manufacture of cellulose organic ester sheets. An object of my invention is to provide cellulose ester sheets having a crystalline or nacreous appearance, such as are useful in the manufacture of toilet articles, novelties, etc. Other objects will hereinafter appear.

In order to produce crystalline effects in cellulose ester sheets, a substance is introduced into the cellulose ester solution from which the sheets are to be cast, which substance is of low solubility in the cellulose ester solvent used in making the solution. As the solvent evaporates, the substance crystallizes out in the sheet. The crystal form is characteristic of the substance used as crystallizing agent. In order to give a beautiful effect, the crystal form should be well defined, and the crystals should impart a soft sheen to the cellulose ester sheet. While flexibility such as is required in motion picture film is not necessary in these decorative sheets, the crystallizing agent should not be a substance which causes actual brittleness of the sheet.

I have discovered that para-phenyl acetophenone is a satisfactory crystallizing agent for use in cellulose acetate and other organic ester sheets, and that it imparts a very beautiful appearance to such sheets. Para-phenyl acetophenone has been described in the literature, and has the structural formula

In order that those skilled in this art may better understand my invention, I would state, by way of illustration, that for the manufacture of sheets, my new composition of matter may be compounded as follows: 100 parts of acetone-soluble cellulose acetate, i. e. cellulose acetate containing from 36% to 42% acetyl radical, approximately, is dissolved with stirring at atmospheric temperature in about 500 parts by weight of acetone. To this solution is added approximately 20 parts by weight of para-phenyl acetophenone. The amount of para-phenyl acetophenone may be increased or decreased somewhat, but I have found that 20 parts gives the most beautiful effect, without bringing about actual brittleness of the sheets made from the composition. 16 parts by weight is approximately the lower limit which will give a good crystalline effect, while the upper limit is determined by the solubility of the para-phenyl acetophenone in the solvent at the lowest temperature used in preparing the dope and making the sheet. The amount of solvent employed may also be increased or decreased, depending upon whether it is desired to have a more or less freely flowing composition, respectively. A composition of matter prepared as described may be deposited upon any suitable film-forming surface to form films or sheets, in a manner well known to those skilled in the art.

Other solvents (instead of acetone) which are compatible with the cellulose acetate and in which para-phenyl acetophenone has only a limited solubility may also occur to those skilled in this art. In like manner this crystallizing agent may be compounded with other single organic esters of cellulose, such as cellulose propionate, butyrate and the like, or with mixed organic esters, such as cellulose aceto-stearate, cellulose aceto-propionate, or cellulose aceto-malate, a suitable solvent which will dissolve the cellulose ester and in which the para-phenyl acetophenone shows only a limited solubility being employed.

What I claim as my invention and desire to be secured by Letters Patent of the United States is:

1. A composition of matter comprising a cellulose organic ester and para-phenyl acetophenone.
2. A composition of matter comprising cellulose acetate and para-phenyl acetophenone.
3. A cellulose organic ester sheet comprising crystallized para-phenyl acetophenone.
4. A cellulose acetate sheet comprising crystallized para-phenyl acetophenone.
5. A composition of matter comprising 100 parts by weight of cellulose acetate and approximately 20 parts by weight of para-phenyl acetophenone.

THOMAS F. MURRAY, Jr.